Jan. 30, 1951 U. E. BOWES 2,539,398
APPARATUS FOR AND METHOD OF FORMING GLASS SHEETS
Filed Jan. 19, 1946 2 Sheets-Sheet 1
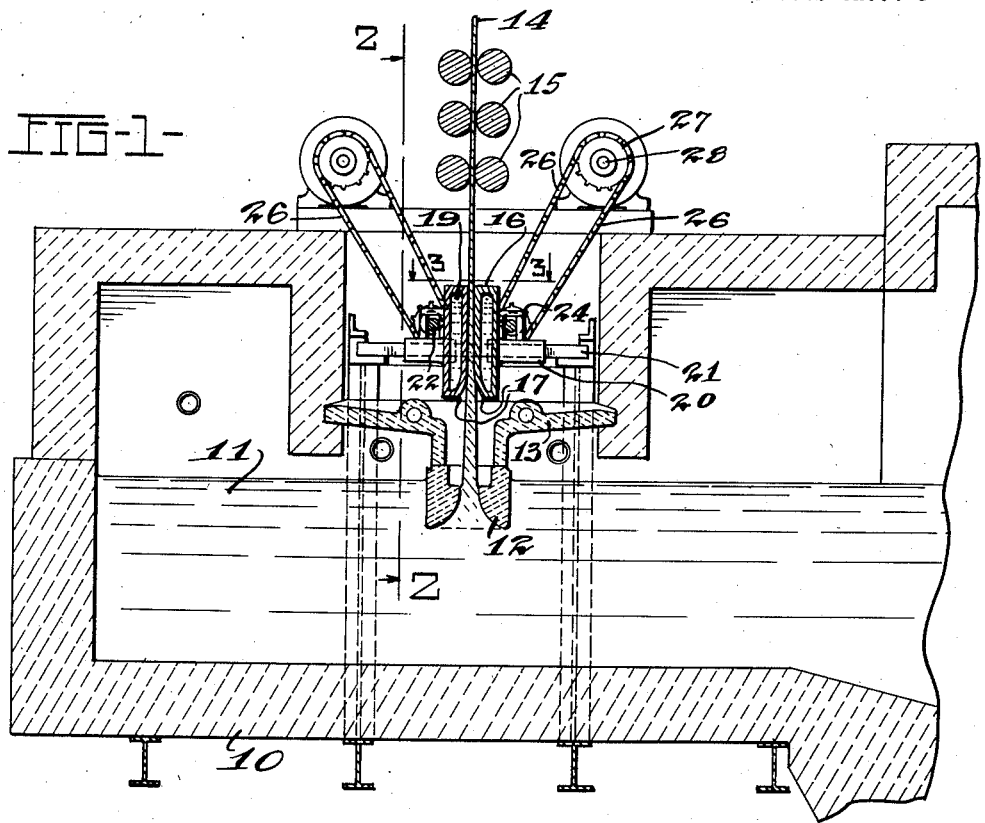
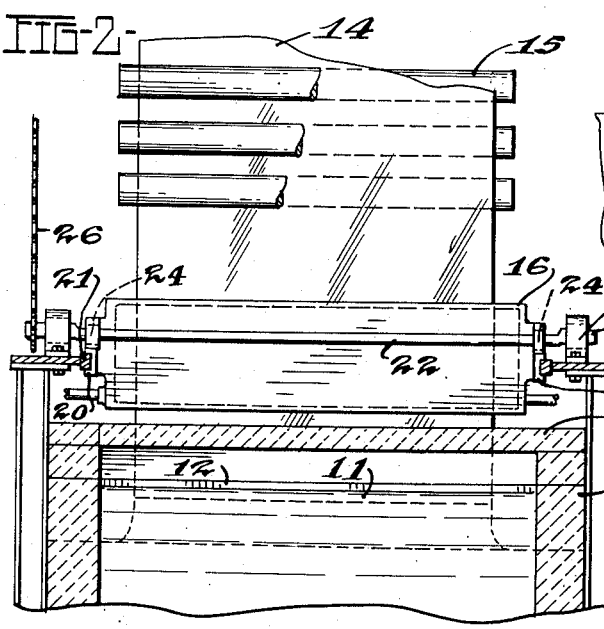
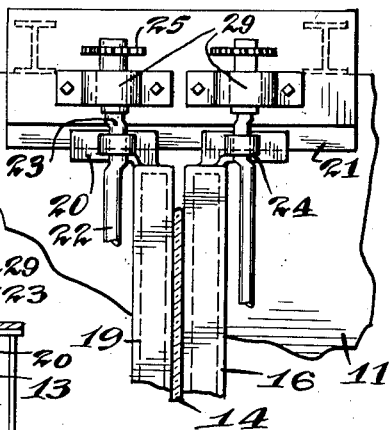
INVENTOR
URBAN E. BOWES
BY Owena Owen
ATTORNEYS Jan. 30, 1951 U. E. BOWES 2,539,398
APPARATUS FOR AND METHOD OF FORMING GLASS SHEETS
Filed Jan. 19, 1946 2 Sheets-Sheet 2
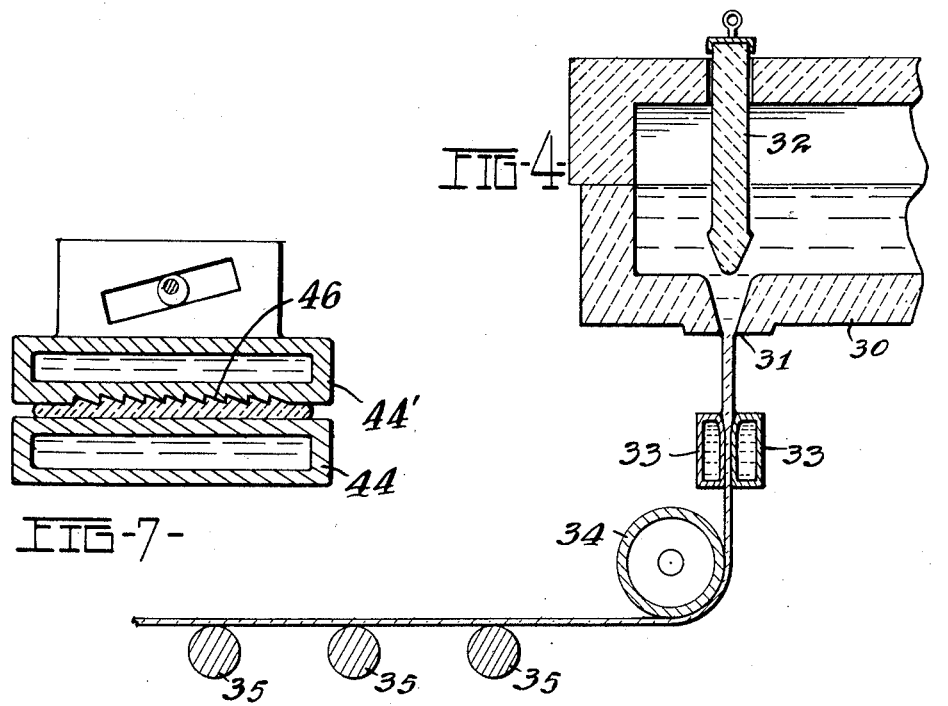
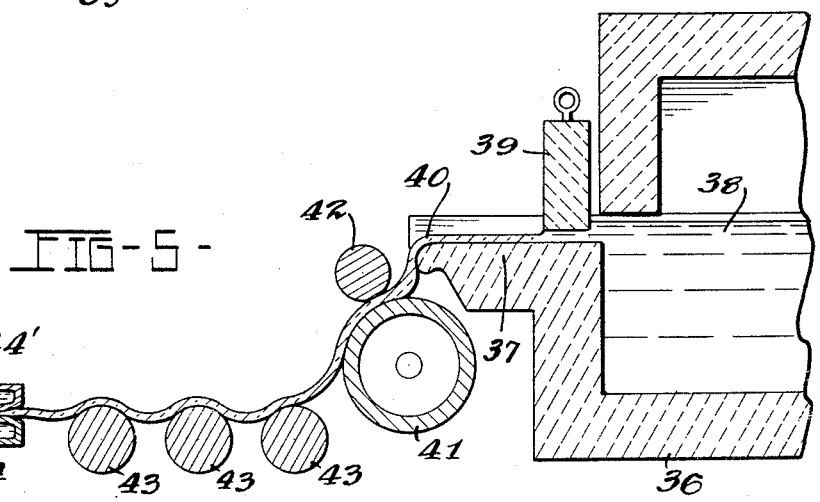
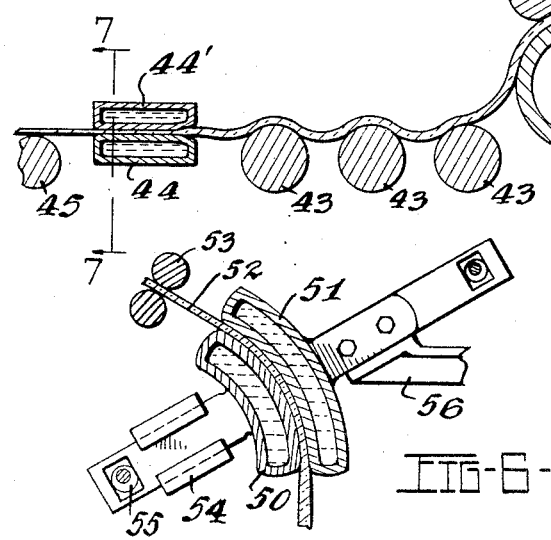
INVENTOR
URBAN E. BOWES
BY Owen & Owen
ATTORNEYS Patented Jan. 30, 1951

2,539,398

UNITED STATES PATENT OFFICE 2,539,398

APPARATUS FOR AND METHOD OF FORMING GLASS SHEETS

Urban E. Bowes, Perrysburg, Ohio

Application January 19, 1946, Serial No. 642,292

6 Claims. (Cl. 49—3)

This invention relates to a method of and apparatus for producing sheets or strips of material in a plastic state and forming the surfaces so as to produce and maintain a desired and uniform cross section while the material is passing from a plastic to a rigid condition. More specifically, it relates to forming the surface by a rapid succession of brief pressures while providing a gaseous cushion so that the set surface has the characteristics of material that sets in contact with gas. In its broader aspects, the invention includes forming the opposite faces of sheets or strips so as to give them any desired straight-line or continuous shape, but preferably the sheets are given plane parallel faces.

The object of the invention is to provide a method and apparatus whereby sheets or strips of plastic material can be formed with each longitudinal surface line perfectly straight and maintained in that condition while setting, and at the same time imparting a surface finish characteristic of like material setting in contact with gas. A particular object of the invention is to form glass sheets with perfectly parallel plane surfaces and with a fire-finish.

One manner of forming glass sheets, for example, has been by drawing upwards a ribbon of glass from a mass of molten glass. Various methods have been employed in an attempt to produce such ribbons in flat form and of uniform thickness, but since the thickness depends upon the rate of elongation, and that in turn depends upon the temperature and consistency of the glass which is inevitably subject to slight differences at different points, the thickness of the glass cannot be made entirely uniform merely by drawing, and it is difficult to keep the ribbon entirely flat. When the ribbon is drawn over a bending roll or when it is drawn up between pairs of rolls, the slight irregularities of the roll surfaces affect the surfaces of the glass. If rolls are depended upon to determine the thickness of the glass, it has not been found feasible to roll the glass to a reduced thickness at a temperature low enough so that the glass will thereafter retain its dimensions during handling because the contact is substantially a line contact, and if the glass at this point is too stiffly plastic, it will not form without an excessive pull thereon; and if it is sufficiently plastic so that it reduces readily in thickness, it will continue to stretch after passing through the rolls.

By the present invention this difficulty is overcome by passing the plastic ribbon through a station where it is subjected to intermittent pressures on opposite sides by plane parallel surfaces. The successive pressures are of short duration and do not interfere with the progressive movement of the ribbon and are so short that the surface of the ribbon is not injured by the contact but is left in fire-finished form.

While formation by flat, parallel surfaces is the preferable method, it is sometimes highly desirable to transport the sheet away from the point of formation at an angle to the direction in which it is drawn from a plastic supply. Where desired, curved forming surfaces may be employed on opposite sides of the sheet to form the parallel surfaces and at the same time change the direction of the glass.

While the invention will be first described in connection with the formation of glass sheets, it may be applied to the formation of sheets from other thermoplastic or thermosetting material. Also, for some purposes it is desirable to give the sheet surface a corrugated, prismatic or other surface. The invention provides a method of and apparatus for doing this readily where the corrugations or other surface formations are uniform longitudinally of the sheet, although the formation of plane surfaces is simpler.

Further objects and details of the invention will appear as the description proceeds.

In the accompanying drawings forming a part of this specification,

Fig. 1 is a vertical section through one form of the invention in which a sheet is drawn upward from a molten mass;

Fig. 2 is a vertical section on the line 2—2 of Figure 1;

Fig. 3 is an enlarged partial plan view approximately on the line 3—3 of Figure 1;

Fig. 4 is a vertical section of another embodiment of the invention in which the material flows down from a molten mass;

Fig. 5 is a vertical section of a third form in which the material flows horizontally from a molten mass.

Fig. 6 is a section of curved forming plates employed for changing the direction of a sheet as well as forming its surfaces, and Fig. 7 is a section on the line 7—7 of Fig. 5, but showing the formers shaped to produce prism glass.

In the form of the invention shown in Figure 1, there is shown a tank 10 for a mass of molten glass 11. A float 12 is provided at the surface of the glass, and above the float there are shields 13. A glass sheet 14 is drawn upward from the float by rolls 15. The sheet cools as it is drawn upward and becomes set during its passage between the float and the draw rolls. During this setting operation the surfaces of the sheet are formed or flattened at a flattening station provided by members 16 which have parallel plane surfaces throughout the greater part of their extent. In the form shown they are provided with slightly diverging surfaces 17 at their lower edges. They are hollow, as indicated at 19, and may be filled with suitable cooling fluid.

At the ends of members 16 there are brackets 20 sliding upon horizontal beams 21, one at each end of the flattening members. Horizontal shafts 22 are provided with crank portions 23 where they pass through slots 24 in brackets 20. On the ends of the shafts there are sprockets 25 driven by chains 26 from sprockets 27 upon suitable drive shafts 28, the shafts being journalled in suitable bearing blocks 29.

It will be readily understood that a ribbon of glass is drawn up in a well-known manner from the slot in float 12, the drawing being continued by rollers 15. As previously indicated, where a pair of rollers is employed to determine approximately the thickness of the glass, the rollers are customarily applied to the glass at a point where it is quite plastic so that it will readily yield to the forming pressure of the rollers. When the apparatus of the type illustrated in Fig. 1 is employed, the glass may be much more stiffly plastic at the point where it is subjected to the forming members 16. In practice it preferably has a viscosity of upwards of 1,000,000 poises when it enters the space between the flattening members 16. The rate of movement of the sheet upward is so related to the consistency of the glass and the width of the slot in float 12 that the sheet reaches the station between the flattening members somewhat thicker than the space between those members at their nearest approach. The movement of the flattening members towards each other is positive and they exert sufficient pressure to reduce the glass to the predetermined thickness. The vibration of the flattening members, due to the rotation of shafts 22, is preferably quite rapid. A frequency of 1800 to the minute has been employed successfully.

Theoretically there is no necessity for any actual reduction in the average thickness of the glass. The sheet will arrive at the flattening station with slight irregularities in the thickness. If it could be governed so that the average thickness was exactly that desired, the flattening members would merely need to reduce the thickness of the thicker portions of the glass and simultaneously increase the thickness of the thinner portions by movement of the glass from the thicker portions. However, in practice this precisely accurate adjustment is difficult to achieve, and, therefore, the sheet preferably has an average thickness slightly greater at the point where it enters the flattening station than the distance between the flattening members at their nearest approach.

The flattening members are separated far enough so that there is a perceptible air space between their surfaces and the sheet of the glass when they are farthest apart. At their nearest approach there must be still a slight layer of gas between the flattening members and the sheet, since the separation of the members does not create a vacuum which would, if present, disturb the flattened surfaces. In practice it is found that this method of flattening the sheet produces true parallel surfaces where the surfaces of members 16 are absolutely flat and parallel, while at the same time leaving fire-finished surfaces on the glass. This can be done in spite of the fact that the members 16 are cooled, because the contact is so brief and there is a gaseous layer between the surfaces of the members and the surfaces of the glass.

In the form shown in Figure 4, there is a tank 30 having a slot 31 in its bottom, with a control plunger or gate 32 which can be raised or lowered to regulate the flow of the material from the slot. There are flattening members 33 provided below the slot, similar to flattening members 16. While no apparatus is shown for vibrating flattening members 33, it will be undersood that they may be operated in the same manner as members 16 or by any equivalent means. While the material preferably leaves the space between members 33 in a condition sufficiently plastic to retain its shape and thickness against the stresses of gravity, it may still be readily bent and in the form shown in Figure 4 it is bent around a bending roll 34 and carried off horizontally over carrying-off rolls 35, this change to the horizontal direction being for purposes of convenience.

In the form shown in Figure 5 there is a tank 36 having a horizontal lip 37 slightly below the level of the molten glass 38 in the tank. A control gate 39 is adjustable to and from the lip to determine the thickness of a ribbon or sheet 40, which flows horizontally over the lip. The ribbon is shown as flowing downward onto a receiving roll 41, against which it is pressed by a roll 42.

While still relatively plastic, the sheet is carried over rolls 43 through a flattening station between flattening members 44, 44' which are similar to flattening members 33 and 16. After the sheet has been reduced to final thickness and flattened while passing between members 44, 44', it is carried off over rollers 45 or similar supports. The form shown in Figure 4, or obvious modifications of that form, is particularly suitable where the plastic stage of the material occurs only during a relatively narrow range of temperature. The forms shown in Figures 1 and 5 are more suitable where there is a considerable range of temperature through which the material is plastic.

The apparatus shown in Fig. 6 is adapted for use in a device similar to that shown in Fig. 1, but where the glass is given a new direction at the point of forming, so that it is moved away from the point of forming at an angle to the vertical. In this embodiment of the invention, the formers 50 and 51 have curved surfaces so that sheet 52 is drawn off by rollers 53 at an angle to the vertical. This could be horizontal if desired.

In the construction shown, plate 50 is shown slidably mounted in bracket 54 and adapted to be vibrated by eccentric 55 in a direction radial of its curved surface. Plate 51 is shown fixed to a bracket 56. If desired, plate 51 could be vibrated also by some convenient means, such as a similar eccentric.

It will be readily understood that the operation of the device shown in Fig. 6 is substantially the same as described for the formers 16 of Fig. 1, except that 50 and 51 act also as a bending roll. It should be noted that, whether one or both of plates 50 and 51 are vibrated, the critical forming takes place when they are the minimum distance apart, and therefore their surfaces must be concentric when they are in that position. One set of plates can be exactly concentric in only one position and can form only one thickness of sheet. If the thickness of the sheet is to be changed, one or both of plates 50 and 51 must be changed accordingly so they will be exactly concentric at the desired distance apart.

In Fig. 7 there is shown a modification of the shaping surface 46 of the upper forming plate 44' so as to form continuous prisms on the face of the sheet. In forming prism glass by molding, there is some difficulty in maintaining sharp and true outlines. If the glass is left in contact with the mold face until completely set, it is apt to craze, while if still plastic when the shaping surface is removed, there is some rounding of the sharp edge and some deformation of the plane surfaces. By a construction such as shown in Fig. 7, the repeated contacts of the forming surface can be continued until the glass is fully set without injury to the surface or setting up excessive internal strains. Accordingly, the exact prismatic design desired is formed and remains when the glass is fully set. Also, the cross section of the glass remains the same throughout its length.

It will be seen that the method and apparatus disclosed above is operable to produce accurate flattening of the surfaces of a sheet while the material is so stiffly plastic that it retains the flattened form imparted to it, and that this flattening can be performed without injury to the fire-finishing of the surface of the sheet. In this way a sheet of material can be produced which is accurate in dimensions and very satisfactory in surface finish. In producing glass sheets this avoids the necessity for final grinding and polishing which has hitherto been considered necessary for optically true flat surfaces on the glass sheets. Similarly, organic materials which are either thermoplastic or thermosetting may be formed in a similar manner by applying the flattening at the stage where the material is set either by cooling or by the continued heat. In the latter case, of course, the flattening members would be heated instead of cooled. Also, while forming sheets with parallel plane surfaces is the simplest form of the invention, it may be applied to other strips having a uniform cross section.

While one form of the apparatus has been shown with some detail in Fig. 1 and variations have been indicated in Figures 4, 5 it will be readily understood that extensive changes in the details of construction and means for operating the flattening members, as well as in the configuration of the members, may be employed while retaining important features of the invention as defined in the appended claims.

While members 16 are shown in Fig. 1 with a continuous hollow space for cooling fluid, where desired the metal in the glass-contacting face of the member may be thin in order to transmit quickly the temperature of the fluid to the contacting surface, and struts or supporting ribs may be provided across the hollow if it is desired to make the surface metal so thin that it might not remain perfectly flat in the absence of such supporting struts or ribs.

When a cooled roller is used for contacting glass, the metal outside of the central hollow must be quite thick to maintain the true form of the roller. It will be seen that, by the device mentioned, the strength of the flattening members 16 may be supplied by their rear walls, if desired, and their faces may be made thin. However, the material may be more nearly set when flattened by members 16 than when rolled, and while the members 16 make contact over a much wider area than rollers do at one time, the fraction of time in which members 16 are nearest together, so as to press the glass, is very small, and so the surfaces of the flattening members can be kept quite cool, if desired, without difficulty and without damage to the finish of the glass.

As mentioned above, the average thickness of the sheet is greater where it enters the flattening station, than the distance between the flattening members at their nearest approach, although for ease of illustration this difference is somewhat exaggerated in the drawings. The reduction in thickness of the sheet by the receiving ends of the flattening members retards the material so that the movement of the material is not as rapid before reaching the flattening station as it is when leaving that station. When the sheet is drawn upward, as in Fig. 1, it stretches by gravity for a distance above the float, so that the thickness of the sheet is greatest as it leaves the float. Obviously, the rate at which material is drawn up between the flattening members determines the rate at which it is drawn to the members, and this rate of draw may be readily adjusted to the width of the slot in the float, the consistency of the glass and the rate of cooling so as to insure at all times an ample supply of glass entering the flattening zone or station.

What I claim is:

1. The method which consists in forming a ribbon of plastic glass somewhat thicker than desired in the finished form and passing the ribbon continuously in a substantially vertical direction between opposed cooled surfaces, the surfaces being fixed against substantial vertical movement and being plane and parallel with each other over an area comprising a material length of travel of the ribbon and slightly diverging at the entrance end of the space between said surfaces, and vibrating the surfaces rapidly in substantially rectilinear lines to and from each other, the nearest approach of the plane surfaces to each other being somewhat closer than the thickness of the ribbon to somewhat reduce the thickness of the ribbon and the vibration being sufficiently rapid to produce many vibrations during the passage of any one portion of glass between said surfaces and sufficiently rapid to avoid injuring the surfaces of the glass.

2. A method in accordance with claim 1 and in which the glass ribbon has a viscosity upwards of one million poises when it enters the space between the surfaces.

3. A method in accordance with claim 1 and comprising cooling the ribbon to a viscosity of upwards of one million poises before it enters the space between said surfaces and in which the ribbon is a flat sheet and the parallel portions of the surfaces are plane.

4. Apparatus comprising means to form a plastic glass ribbon, means to move the glass ribbon in a substantially vertical direction away from its source through a setting station and opposed members on opposite sides of the ribbon at said setting station, said opposed members being fixed against substantial vertical movement and having opposed parallel plane surfaces for a material distance in the line of travel of the glass with slightly diverging surfaces at the entrance end of the space between them, and means to vibrate said surfaces substantially rectilinearly towards and from each other close enough to somewhat reduce the thickness of the glass as it passes therebetween and with sufficient rapidity of vibration to vibrate the surfaces many times during the passage of any one portion of glass between the parallel portions of said surfaces.

5. Apparatus comprising means to form a plastic glass ribbon, means to move the glass ribbon in a substantially vertical direction away from its source through a setting station and opposed members on opposite sides of the ribbon at said setting station, said opposed members being fixed against substantial vertical movement and having opposed parallel plane surfaces for a material distance in the line of travel of the glass with slightly diverging surfaces at the entrance end of the space between them, and means to vibrate said surfaces substantially rectilinearly towards and from each other close enough to somewhat reduce the thickness of the glass as it passes therebetween and with sufficient rapidity of vibration to vibrate the surfaces many times during the passage of any one portion of glass between the parallel portions of said surfaces, means for cooling said surfaces, and the means for vibrating the surfaces being capable of sufficiently rapid vibration to avoid injury to the glass surface passing therebetween.

6. Apparatus comprising a source of a plastic glass sheet, means for continuously moving the sheet of plastic glass in a substantially vertical path, members having flat parallel surfaces on opposite sides of the path of the sheet, means for fixing said members against substantial vertical movement means for vibrating the members substantially rectilinearly towards and from each other close enough to reduce the thickness of the sheet as it passes continuously therebetween and with sufficient rapidity to avoid injury to the surface of the glass as it passes therebetween.

URBAN E. BOWES.

REFERENCES CITED

The following references are of record in the file of this patent:

UNITED STATES PATENTS

| Number | Name | Date |
| --- | --- | --- |
| 661,024 | Ripley et al. | Oct. 30, 1900 |
| 788,147 | Shuman | Apr. 25, 1905 |
| 952,390 | Wadsworth | Mar. 15, 1910 |
| 1,162,114 | Swarovski | Nov. 30, 1915 |
| 1,550,427 | Corl | Aug. 18, 1925 |
| 1,592,228 | Shuman | July 13, 1926 |
| 1,676,772 | Cox et al. | July 10, 1928 |
| 1,761,198 | Drake | June 3, 1930 |
| 1,805,206 | Crowley | May 12, 1931 |
| 2,051,011 | Smith | Aug. 11, 1936 |
| 2,195,683 | Ross et al. | Apr. 2, 1940 |
| 2,300,760 | Amigo | Nov. 3, 1942 |
| 2,320,341 | Bowes | June 1, 1943 |
| 2,382,379 | Boudin | Aug. 14, 1945 |

FOREIGN PATENTS

| Number | Country | Date |
| --- | --- | --- |
| 5,879 | Great Britain | 1907 |